United States Patent [19]

Bowerman

[11] Patent Number: 5,733,216
[45] Date of Patent: Mar. 31, 1998

[54] THRUST-BLOCK FOR C-CLIP DIFFERENTIAL

[75] Inventor: Ward E. Bowerman, Rochester, N.Y.

[73] Assignee: Zexel Torsen Inc., Rochester, N.Y.

[21] Appl. No.: 682,101

[22] Filed: Jul. 17, 1996

Related U.S. Application Data

[63] Continuation-in-part of Ser. No. 400,809, Mar. 8, 1995, Pat. No. 5,554,081.

[51] Int. Cl.$^6$ ............................................ F16H 48/10
[52] U.S. Cl. ............................................................ 475/252
[58] Field of Search ...................................... 475/248, 249, 475/252

[56] References Cited

U.S. PATENT DOCUMENTS

| | | | |
|---|---|---|---|
| 3,375,736 | 4/1968 | Saari | 475/160 |
| 4,365,524 | 12/1982 | Dissett et al. | 475/226 |
| 5,098,356 | 3/1992 | Guidoni et al. | 475/227 |
| 5,122,101 | 6/1992 | Tseng | 475/252 |
| 5,122,102 | 6/1992 | Chludek et al. | 475/252 |
| 5,221,238 | 6/1993 | Bawks et al. | 475/226 |
| 5,389,048 | 2/1995 | Carlson | 475/252 |
| 5,415,601 | 5/1995 | Cilano | 475/160 |
| 5,492,510 | 2/1996 | Bowerman | 475/252 |
| 5,554,081 | 9/1996 | Bowerman | 475/252 |

FOREIGN PATENT DOCUMENTS 0130806  1/1985  European Pat. Off. .

*Primary Examiner*—Charles A. Marmor
*Assistant Examiner*—Sherry Lynn Estremsky
*Attorney, Agent, or Firm*—Eugene Stephens & Associates

[57] ABSTRACT

A parallel-axis torque-proportioning differential has four pairs of planet gears arranged symmetrically-but-non-equiangularly about a common axis in two mirror-image gear sets separated by angular spacings adequate to permit access for C-clip assembly. A thrust-block, positioned between the opposed end faces of the sun/side gears, is not supported in a housing window but rather is supported on the outer circumferential surfaces of four planet gears, two from of each set, so that the housing window can be significantly larger than the thrust-block, thus increasing lubrication and lessening the cost and weight of the housing and reducing the weight of the required thrust-block. Also, the thrust-block may include two side-by-side mating members separated by a spring element to exert a preload force between the opposed end faces of the side gears.

17 Claims, 6 Drawing Sheets

THRUST-BLOCK FOR C-CLIP DIFFERENTIAL

RELATED APPLICATIONS

This is a continuation-in-part of U.S. patent application Ser. No. 08/400,809, filed 8 Mar. 1995, and entitled DIFFERENTIAL WITH DISTRIBUTED PLANET GEARS, now U.S. Pat. No. 5,554,081.

TECHNICAL FIELD

The invention relates to torque-proportioning type automotive differentials that accommodate vehicle axles requiring C-clip assembly.

BACKGROUND OF INVENTION

Gear differentials generally include compound planetary gear sets interconnecting a pair of drive axles to permit the latter to rotate in opposite directions with respect to a differential housing. The drive axles rotate about a common axis; and a pair of respective side gears (sometimes called "sun" gears) are fixed for rotation with the inner ends of the two drive axles, such side gears acting as the sun gear members of the compound planetary gear sets. The side gears are interconnected by planet gears usually arranged as sets of meshing pairs, being spaced circumferentially and equidistant about the common axis of the sun gears. The invention relates primarily to "parallel-axis" differentials in which the planet gears are mounted on axes parallel to the common axis of the sun gears.

The entire planetary gearing arrangement within the differential housing supports opposite relative rotation between the drive axle ends (i.e., differentiation), which is necessary to permit the axle ends to be driven at different speeds. Torque transmitted to the drive axles through the inclined tooth surfaces of the sun/side gears generates thrust forces against gear-mounting bearing surfaces within the differential. (Such bearing surfaces usually comprise journals formed in the housing, or may be the bores or the ends of the bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles are referred to as "torque-proportioning" differentials and are used to improve traction capabilities of vehicles.

In some prior art designs, frictional resistance is supplemented by preload spring forces applied between the side gears and the housing [as in U.S. Pat. No. 5,221,238 (Bawks et al.)] or applied between the opposing end faces of the side gears [see U.S. Pat. No. 3,375,736 (O. E. Saari); U.S. Pat. No. 5,098,356 (Guidoni et al.); and European Patent No. 0 130 806 (R. T. Quaife)].

With particular pertinence to this invention, a significant portion of automobiles presently being manufactured throughout the world use so-called "C-clips" for assuring that the axle ends cannot be accidentally withdrawn from the differential (see U.S. Pat. No. 4,365,524 issued to Dissett et al.). In this well-known type of assembly, C-shaped (i.e., partial ring) fasteners are fitted within annular grooves formed near the axle ends after the latter have been inserted through respective journals formed in the differential housing and through a respective one of the sun/side gears.

In order to complete this C-clip assembly, it is necessary to provide space for some relative motion between each axle end and the differential housing so that each axle end can be inserted within the differential case for a sufficient distance to expose the locking ring groove formed in the axle end. Once the C-clip locking ring is installed in place, the axle part is then withdrawn to a desired position for normal driving operation.

Accommodation for C-clip assembly requires that a window be provided in the housing with dimensions sufficient to permit appropriate access to the interior of the differential. Also, sufficient space must be available within the differential housing to permit the insertion and attachment of the C-clips to the axle ends. This space requirement is traditionally met with existing higher-bias parallel-axis designs by the removal of at least one set of the differential's planetary gear pairs, even though such parallel-axis differentials cannot afford to lose such a gear set. That is, the loss of such planetary gearing reduces the differential's available torque capacity below the levels specified for its appropriately practical torque-proportioning use.

Of course, known designs could be significantly enlarged to provide the space requirements of C-clip assembly between existing planetary gear sets, but such enlargement would not be acceptable to the automotive industry which places high priority on space and weight reduction.

Recently, the assignee of this invention has designed several new parallel-axis differentials with gear arrangements adaptable for C-clip assembly (see U.S. patent application Ser. No. 08/400,809, filed Mar. 8, 1995, by W. E. Bowerman); and one such preferred gear arrangement is incorporated in this invention, as will be discussed below.

During the C-clip assembly process and after each axle is withdrawn to a desired position for normal driving operation, it is necessary to prevent further axial movement of the axles in order to maintain them and their respectively captured C-clips in the desired position. This is often accomplished by inserting a block-like spacer (hereinafter "thrust-block") between the opposed inner faces of the side gears [see U.S. Pat. No. 5,221,238 (Bawks et al.)]. In prior art differentials manufactured by the inventors' assignee, such thrust-blocks have been supported in operative position by the edges of the access window [see U.S. Pat. No. 5,389,048 (L. S. Carlson) and U.S. Pat. No. 5,492,510 (W. E. Bowerman)]. To ensure accuracy of these latter designs, the boundaries of the access windows, which are roughly cast-formed during the initial manufacture of the housing, must be finish machined. This, of course, adds significant cost to the manufacture of the housing.

In other differential designs, unrelated to C-clip assembly but also assigned to the assignee of this invention, a center washer is positioned between the opposed end faces of the side gears to facilitate lubrication and/or to enhance control of the differential's torque bias [see U.S. Pat. No. 5,415,601 (J. E. Cilano)]. Such center washers are restrained by the outer circumferences of the shank portions of differential's planet gears.

The invention herein provides a significant simplification in the design and manufacture of parallel-axis differentials of the types identified above.

SUMMARY OF THE INVENTION

A parallel-axis torque-proportioning differential according to this invention has a generally cylindrical housing for supporting a pair of sun/side gears adapted to receive respective axle ends for rotation about a common axis, and these side gears and their respective axle ends are interconnected in a mutual driving and load-transmitting relationship through at least two meshing pairs of cylindrical planet/combination gears positioned circumferentially in the housing about the common axis. Each planet gear combines a first meshing portion that engages one of the side gears and a second meshing portion that is in engagement with a respective meshing portion of its paired planet gear.

In the preferred embodiments disclosed herein, as in the parent case identified above, four sets of planetary gear pairs are mounted within a differential housing having exterior dimensions substantially identical to those presently being used for comparable prior art parallel-axis designs referred to in the Background section above. Further, with this novel configuration, the four planetary sets of the invention have the same number of combination gears (eight) as a typical prior art differential using four planetary sets of paired combination gears. Also, these four planetary sets have the same number of gear meshes and generate the same total thrust forces as do the planetary sets of such a typical prior art device. Therefore, the gear trains of the invention exhibit comparable frictional resistance to relative rotation between the drive axles, thereby providing comparable bias ratios, torque capacities, and exterior dimensions in an unconventional format that has important commercial advantages.

In the preferred embodiments of the invention, the planetary pairs are received and supported in the housing by being positioned within a plurality of bores. Also, all of these combination gears are of the assignee's recent straddle design (see U.S. Pat. No. 5,122,101 to G. B. Tseng and U.S. Pat. No. 5,492,510 to W. E. Bowerman) in order to provide greater control over bias ratio and a more balanced loading of the combination gears. That is, each combination gear meshes with its paired combination gear at two separated areas that straddle the position where each combination gear meshes with its respective sun gear.

More particularly, in the preferred embodiments disclosed in this continuation, the planet gears have the special design shown in U.S. Pat. No. 5,492,510 identified above. That is, while each preferred planet gear conventionally engages one of the differential's side gears at a first meshing portion, its second meshing portion (which is in meshing engagement with its paired planet gear) is divided into three separate engagement areas. These three engagement areas shared by each pair of mating planet gears are separated from each other along each planet gear's respective axis of rotation.

Each planet gear's first and second engagement areas straddle the first meshing portion (that is shared with its respective side gear), while its second and third engagement areas straddle the space where its paired planet gear is in mesh with the differential's other side gear. In each planetary pair, the first engagement area of one planet gear meshes with the third engagement area of its mating planet gear, while the second engagement areas of both gears are in mesh with each other. The second and third engagement areas of each planet gear are preferably separated by a stem having an outer diameter that is smaller than the outer diameter of the second and third engagement areas. These separating stems provide clearance for the side gear that is in mesh with its paired planet gear.

Also, as is most pertinent to the invention, in all embodiments the opposed end faces of the side gears are spaced apart along their respective common axis by a predetermined distance selected to provide appropriate clearance between the side gears to accommodate the assembly of C-clip axle retainers and/or preload apparatus, and this spacing can also be used in combination with at least one enlarged window formed in the housing to facilitate lubrication and heat dissipation.

Clearance for C-clip assembly is provided directly through the differential housing by organizing the differential's four pairs of meshing planet gears in two two-pair sets, the sets being positioned 180° apart about the common axis of a housing having exterior dimensions substantially identical to those presently being used for prior art parallel-axis designs and providing comparable bias ratios and torque capacities. The four planetary sets of the disclosed embodiments are organized as four separate and distinct meshing pairs that are positioned circumferentially and symmetrically in the housing about the common axis of the side gears. However, the planetary sets are not positioned equiangularly about the common axis. Instead, they are arranged about the common axis in two separated sets, with each planetary set comprising two of the separate and distinct planet gear pairs.

The two sets of planet gears are arranged in the differential housing about two orthogonal radial centerlines. Each of the two sets is centered along a first one of the orthogonal lines, while the two planetary sets are separated from each other by respective first angular spacings which are equal in size and bisected by the second orthogonal line. Within each set, the two planetary pairs are separated from each other by a second angular spacing that is equal in size in each set and bisected by the first orthogonal line. However, the first angular spacings (between the two planetary sets) are substantially larger angles than the second angular spacings between the planetary pairs within each set so that, preferably, (a) the two sets are separated by a distance substantially larger than the predetermined diameter of the outer circumferential surfaces of the planet gears, while (b) the mating planetary pairs of each set are separated by a spacing that is substantially smaller than the predetermined diameter of the outer circumferential surfaces of the planet gears.

Therefore, the four pairs of planet gears are distributed symmetrically-but-non-equiangularly about the common axis, and the two separated planet gear sets are arranged in a mirror-image relationship relative to each other.

The first angular spacings separating the two planetary sets are of sufficient size to permit the use of large windows in the housing. Such large windows, which are positioned in circumferential alignment with each of the first angular spacings, facilitate lubrication and, in combination with the axial separation between the opposed end faces of the side gears referred to above, also provide appropriate access to accommodate C-clip assembly as well as insertion of the invention's simplified preload apparatus.

Further, according to this invention, the side gears are separated by a novel thrust-block which, following C-clip assembly of the two axles, is received in an inner passageway that is aligned with the second orthogonal line referred to above, this passageway extending between the opposed end faces of the side gears from an enlarged housing window. The thrust-block has two respective thrust surfaces, each facing a respective one of opposed end faces of the side gears; and its thickness, measured between the thrust surfaces (along the common axis), is equivalent to the predetermined space separating the side gears along their common axis.

On the periphery of the thrust-block, connecting its two thrust surfaces, are two respective support surfaces, each extending along the length of the thrust-block (i.e., parallel to the second orthogonal line). The width of the thrust-block, measured between these two support surfaces, is equivalent to the shortest distance between the two sets of planet gears. Namely, the width of the thrust-block is determined by the distance between the outer circumferential surfaces of the two end planet gears, one from each set, that are separated by the first angular spacing between the sets.

The length of the novel thrust-block is less than the maximum lengthwise dimension of the housing's inner passageway. That is, the thrust-block is short enough to fit totally within the housing; and the thrust-block is supported on the outer circumferential surfaces of the four end planet gears, two from of each set, that are separated by the first angular spacing between the sets, being restrained from radial movement by a retainer screw. The thrust-block is not supported in a housing window; and, therefore, the housing window, used for access to the C-clips, does not require machining; and its size can be significantly larger than the thrust-block, thus lessening the cost and weight of the housing and reducing the weight of the required thrust-block.

In one embodiment of the invention, the thrust-block is constructed from two side-by-side mating members, each having a respective exterior thrust surface that is positioned in contact with a respective one of the opposed end faces of the side gears. This design facilitates use of the differential with thick ring gears (i.e., the large gears that are attached to the housing flange to drive the differential). Such thick ring gears may partially cover the access window of the housing, not leaving sufficient space to insert a one-piece thrust-block.

Also, this split thrust-block design permits the block to be utilized to provide a preload force for the differential. For this latter feature, at least one of the mating thrust-block members is preferably provided with at least one bore having a predetermined depth for receiving and positioning a spring element (e.g., a Belleville washer) between the mating thrust-block members. The spring element acts against the thrust-block members to exert a preload force between the opposed end faces of the side gears. To facilitate assembly of the spring-loaded thrust-block between the opposed end faces of the side gears, the exterior thrust surfaces of the mating thrust-block members are provided with a tapered lead at one end.

With this design, a preload force can be added simply and inexpensively without requiring any physical change to any of the other elements of the differential. In addition, preload force is simply and inexpensively controlled by merely adjusting the predetermined depth of the spring-holding bore. Also, by arranging the helical teeth of the side gears so that, during forward operation, the side gears exert thrust forces outwardly against the housing, the added preload force becomes effective at all times during forward operation of the differential.

The commercial importance of the invention can be readily appreciated from the features generally described. Namely, these improvements achieve substantial cost reduction in the manufacture of parallel-axis differentials used to accommodate C-clip assembly (i) by simplifying both design and assembly, (ii) by reducing weight and size, and (iii) by enhancing the flow of lubricant; and all of these benefits are realized without sacrificing torque capacity or strength.

DRAWINGS

FIGS. 1 and 2 are respective cross-sectional views of a torque-proportioning differential with gearing arranged according to a preferred embodiment of the invention and in which the inner ends of output drive shafts are trapped within the differential by C-clips and a standard thrust-block is positioned between the side gears, FIG. 1 being taken along the line 1—1 of FIG. 2, while FIG. 2 is taken along the line 2—2 of FIG. 1.

Figure 5:
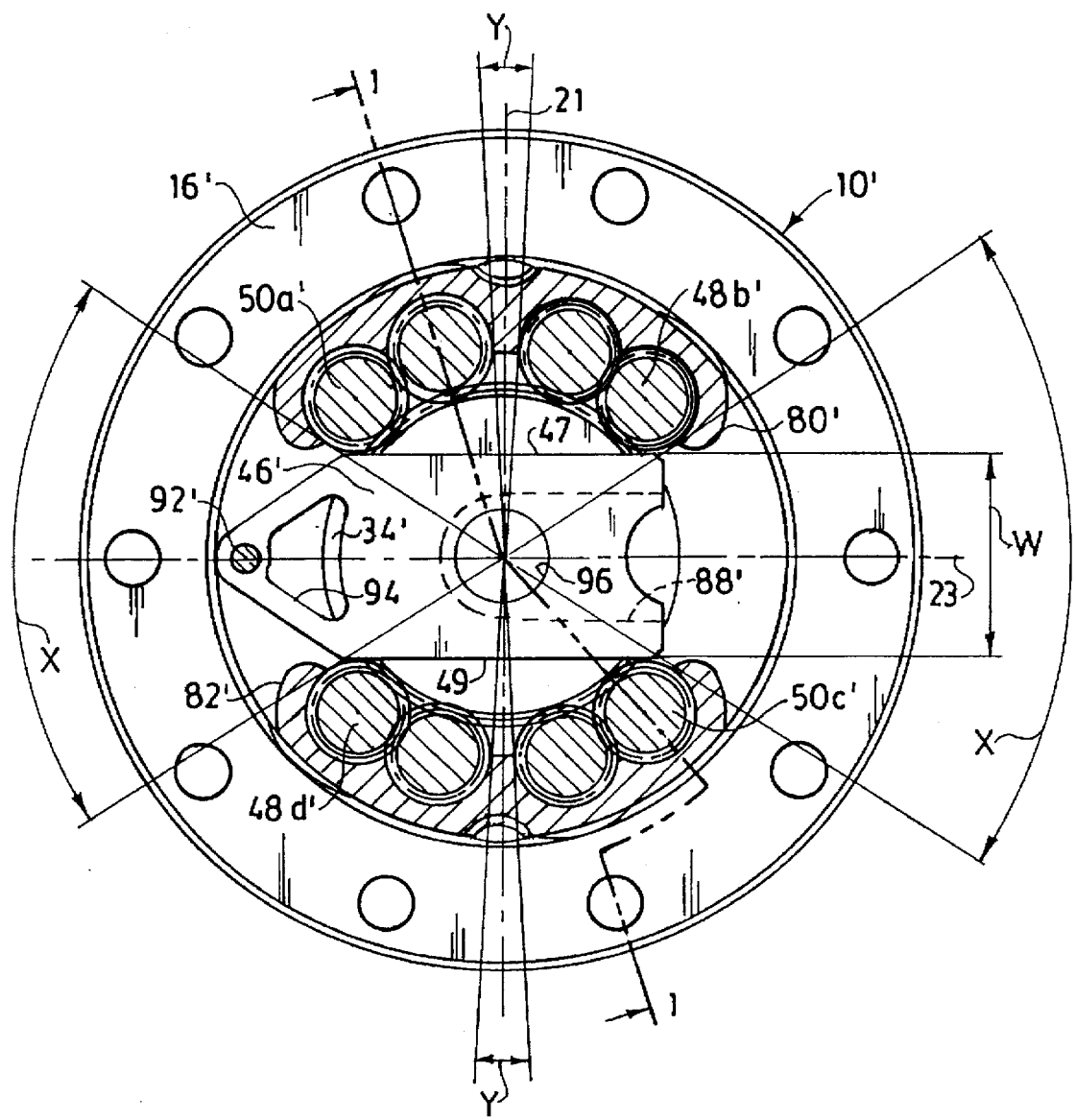
FIG. 5 is a cross-sectional view, similar to FIG. 2, of the torque-proportioning differential shown in FIGS. 1, 2, 3, and 4 modified slightly to accommodate a preferred thrust-block according to one embodiment of the invention.
Figure 6:
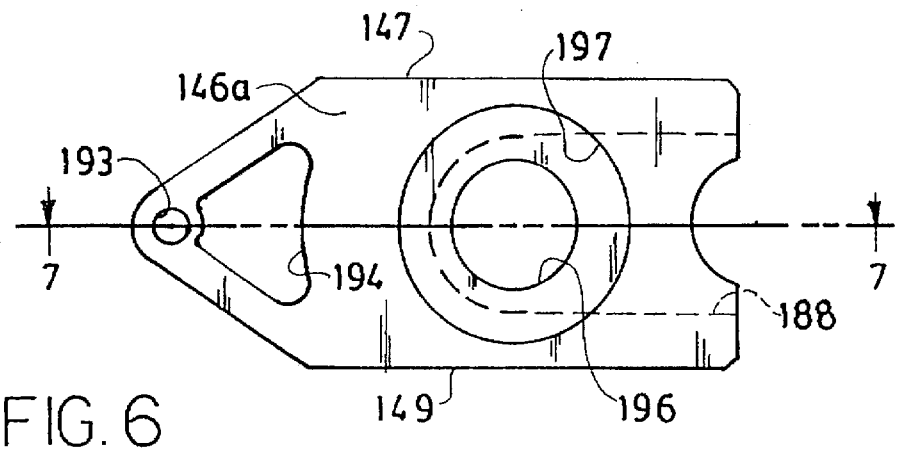
Figure 7:
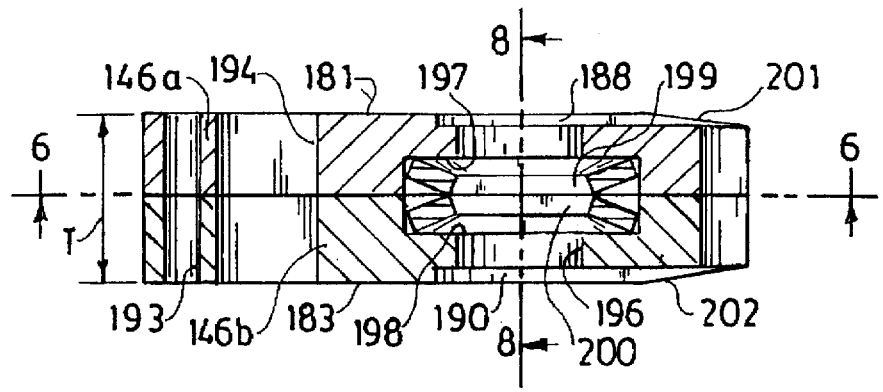
Figure 8:
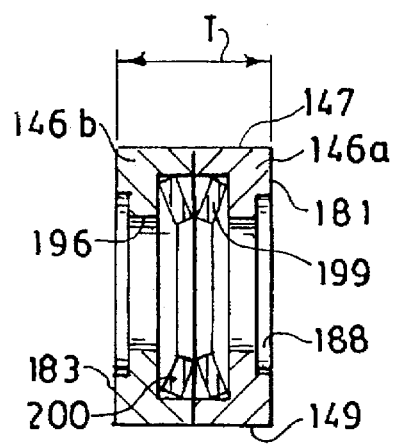

FIGS. 6, 7, and 8, are, respectively, side, top, and end views of a thrust-block according to another embodiment of the invention, this further thrust-block being similar to that shown in FIG. 5 but slightly modified to provide the differential with a desired spring preload, FIG. 6 being a view taken along plane 6—6 in FIG. 7, FIG. 7 being a view taken along plane 7—7 in FIG. 6, and FIG. 8 being a view taken along plane 8—8 in FIG. 7.

DETAILED DESCRIPTION

The differential illustrated in FIGS. 1, 2, 3, and 4 has a housing 10 that includes a main body 12 and an end cap 14. Bolts (not shown) attach end cap 14 to main body 12. A flange 16 is provided with holes 18 to attach a ring gear (not shown) for transmitting drive power to housing 10. A pair of output drive shafts 20 and 22 are received through trunnions 24 and 26 at opposite ends of housing 10. Trunnions 24 and 26 have journals 28 and 30 for rotating housing 10 within a vehicle chassis (not shown) about the common axis 32 of output shafts 20 and 22.

The inner ends of the output shafts 20 and 22 are splined to respective first and second side gears 34 and 36. In addition, removable locking elements, which are formed as C-clip washers 38 and 40, capture the inner ends of output shafts 20 and 22 within side gear recesses 42 and 44. A thrust-block 46, positioned between side gears 34 and 36, further restricts axial movement of the inner ends of output shafts 20 and 22.

Figure 1:
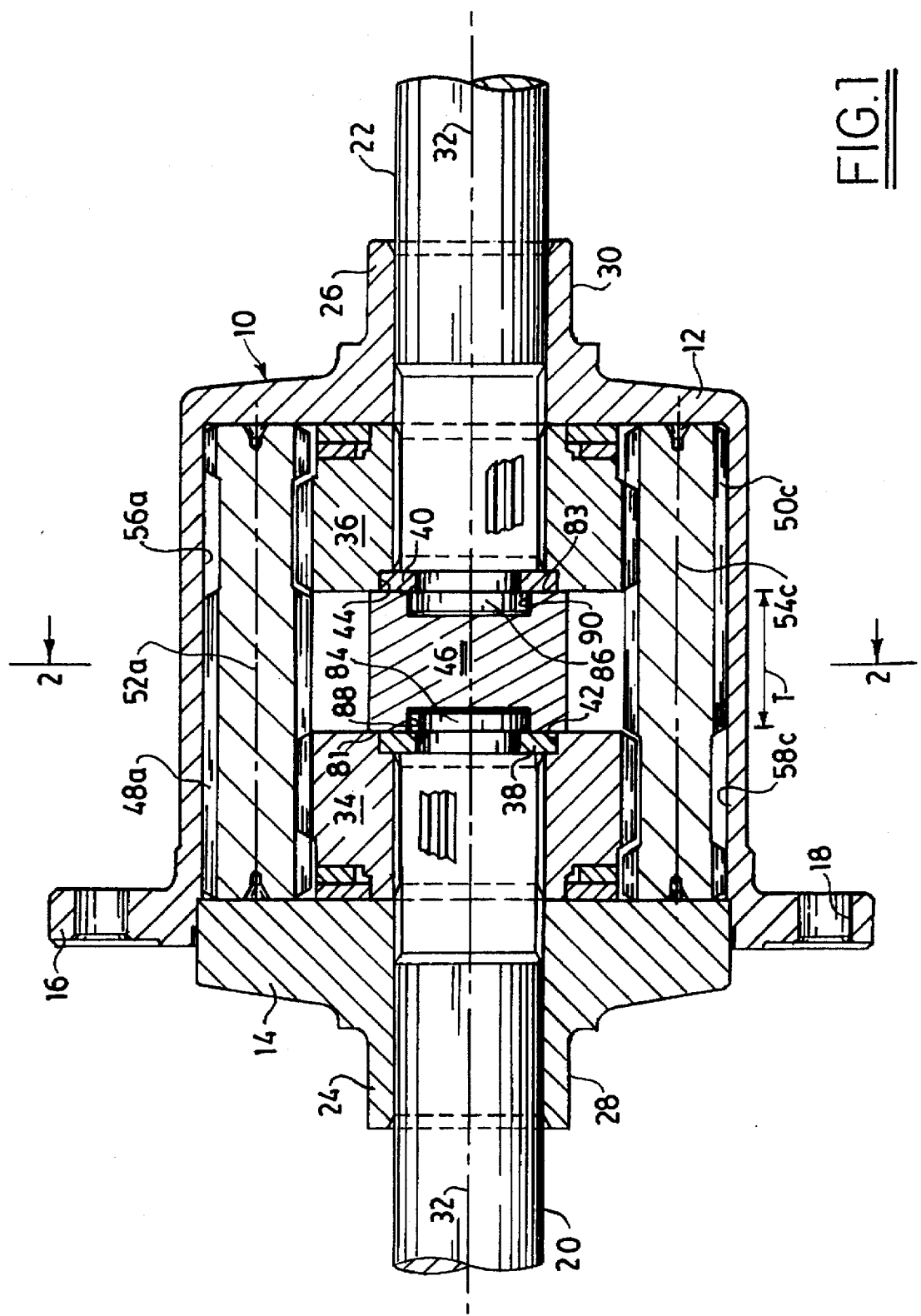

Side gears 34 and 36 are interconnected by four pairs of planet gears 48a, 50a; 48b, 50b; 48c, 50c; and 48d, 50d that are rotatable about respective axes that extend parallel to common axis 32, two of these respective axes being identified in FIG. 1 by reference numerals 52a and 54c. The outer diameter surfaces of the planet gears are rotatably supported by respective bearing surfaces that are formed as pockets in main body 12, two of these respective bearing surfaces being identified in FIG. 1 by reference numerals 56a and 58c.

Figure 4:
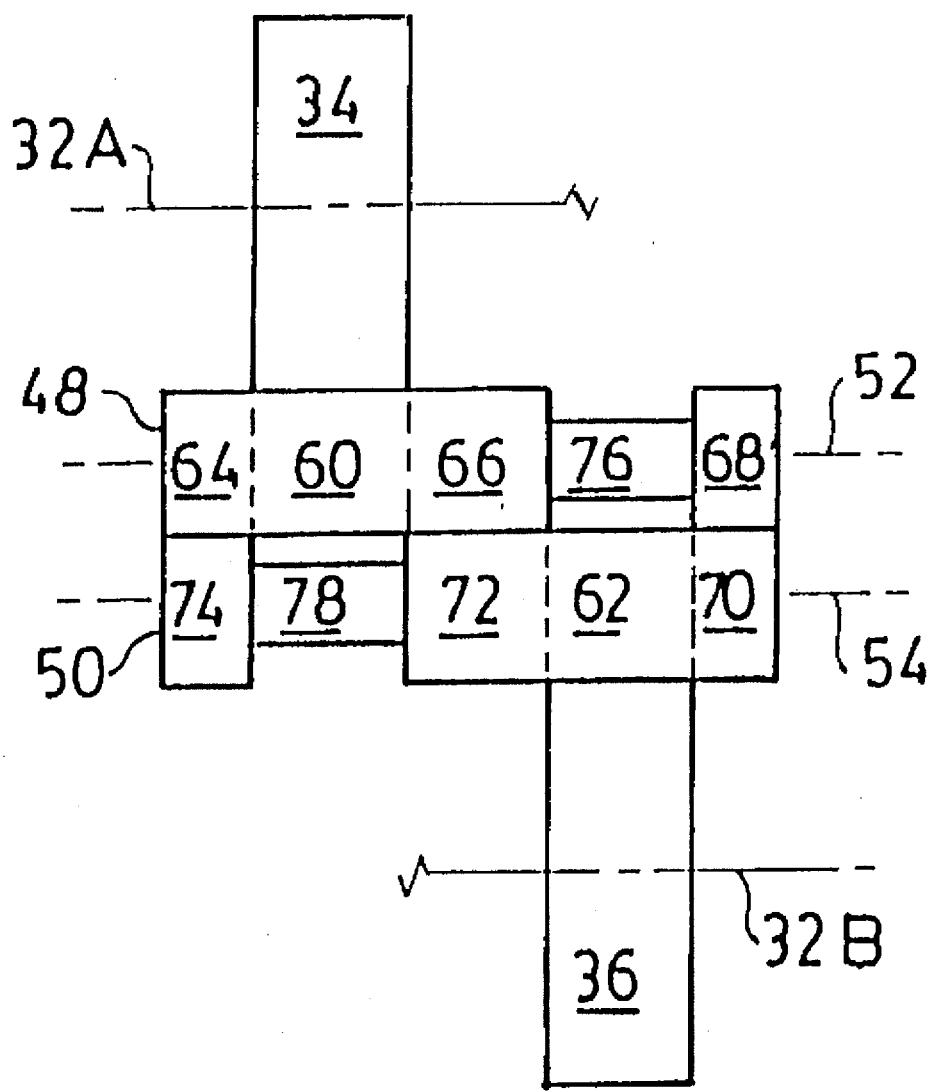
FIG. 4 is a diagrammatic representation of the planetary gearing arrangement shown in FIGS. 1 and 2 with the individual gears rotated in mesh out of their mounting positions into a common axial plane.

A layout of one of the pairs of planet gears 48 and 50 in mesh with the side gears 34 and 36 is shown in FIG. 4. In the view of FIG. 4, common axis 32 has been split into two halves 32A and 32B to enable the side gears 34 and 36 to be rotated in mesh with the planet gears 48 and 50 into a common axial plane.

It can be seen that each planet gear 48, 50 is in mesh with a respective one of the side gears 34, 36 as well as with its paired planet gear. In the preferred gearing embodiment disclosed in FIGS. 1, 2, and 4, each planet gear 48 has a first meshing portion 60 that is in mesh with side gear 34, while its paired planet gear 50 has a first meshing portion 62 that is in mesh with side gear 36. Planet gears 48, 50 each have a second meshing portion with which they engage each other. Namely, the second meshing portion of planet gear 48 is comprised of three separate engagement areas 64, 66, and 68, while the second meshing portion of planet gear 50 is divided into three separate engagement areas 70, 72, and 74. First engagement area 64 of planet gear 48 is in engagement with third engagement area 74 of planet gear 50, while first engagement area 70 of planet gear 50 is in mesh with third engagement area 68 of planet gear 48. The respective second engagement areas 66, 72 of the planet gears are in mesh with each other. Further, the first and second engagement areas 64, 66; 70, 72 are contiguous with the respective first meshing portion 60, 62 of each planet gear, while second and third engagement areas 66, 68; 72, 74 are separated by respective stem portions 76, 78, which are formed with smaller diameters than are the adjacent meshing portions to prevent interference with respective side gears 36 and 34.

First and second engagement portions 64, 66 of planet gear 48 are separated by its first meshing portion 60, while first and second engagement areas 70, 72 of planet gear 50 are separated by its first meshing portion 62. Therefore, paired planet gears 48 and 50 share three separate and distinct engagement areas separated along their respective axes. Meshing engagement areas 64, 74; 66, 72 straddle side gear 34, while meshing engagement areas 66, 72; 68, 70 straddle side gear 36. Further, side gears 34, 36 (which are separated along common axis 32 by a predetermined spacing) straddle meshing engagement areas 66, 72 of the planet gears.

Preferably, side gears 34, 36 are spaced apart along common axis 32 through a distance equivalent to the effective face width of side gear 34. Further, planet gears 48, 50 are preferably designed so that this distance is also equivalent to the effective face width of their shared meshing engagement areas 66, 72 and so that this effective face width is equal to the length of overlap between the mating planet gear teeth in an axial plane.

Second engagement areas 66, 72 increase the total amount of effective face width shared by planet gears 48, 50. This reduces the amount of stress that would otherwise be present at the two other shared engagement areas 64, 74; 68, 70. Also, the outer diameter surfaces of second engagement areas 66, 72 provide additional journal support against the housing pocket bearing surfaces in which the respective planet gears are mounted, thereby reducing planet gear mounting stresses within housing 10.

Figure 2:
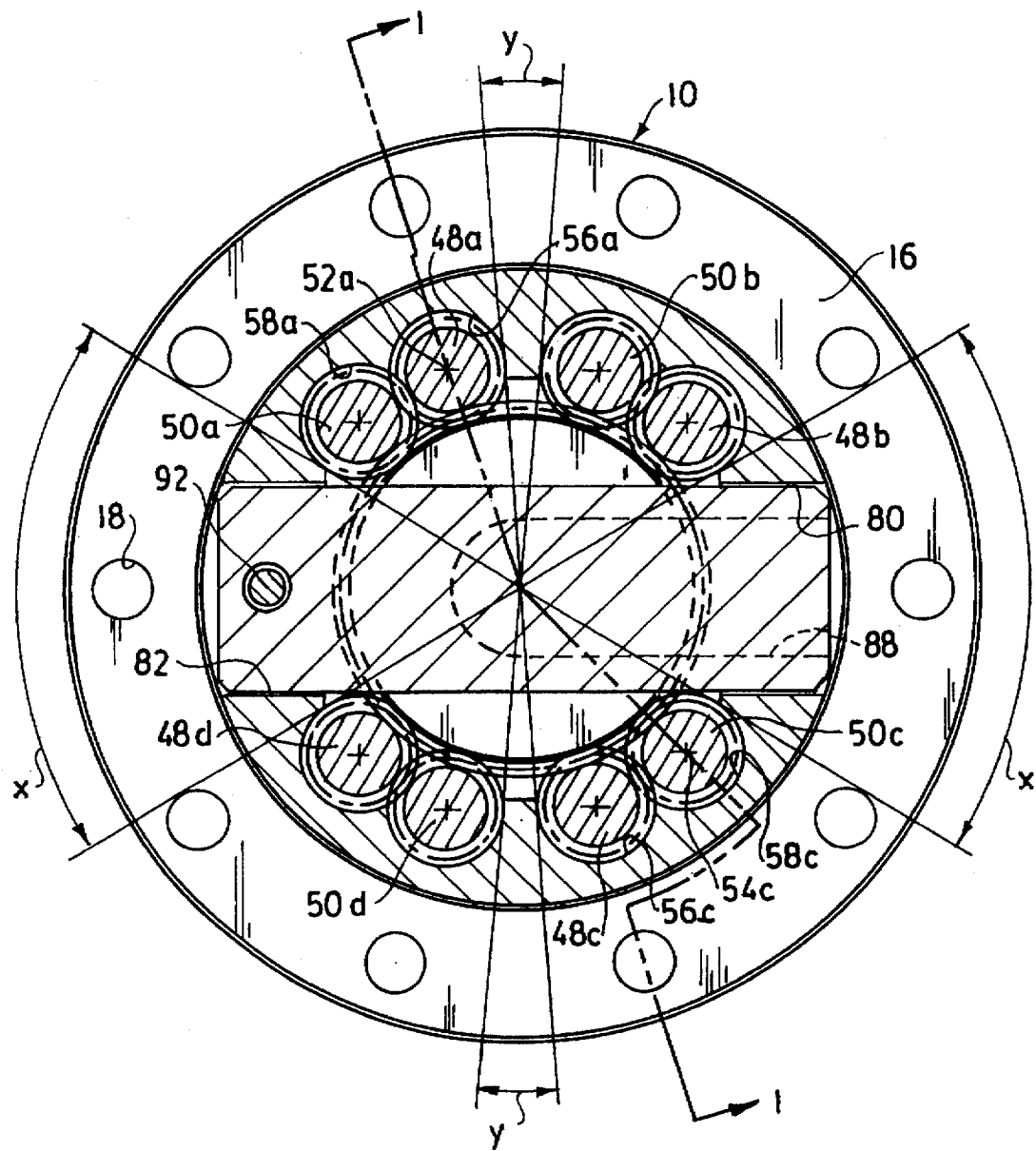
Figure 3:
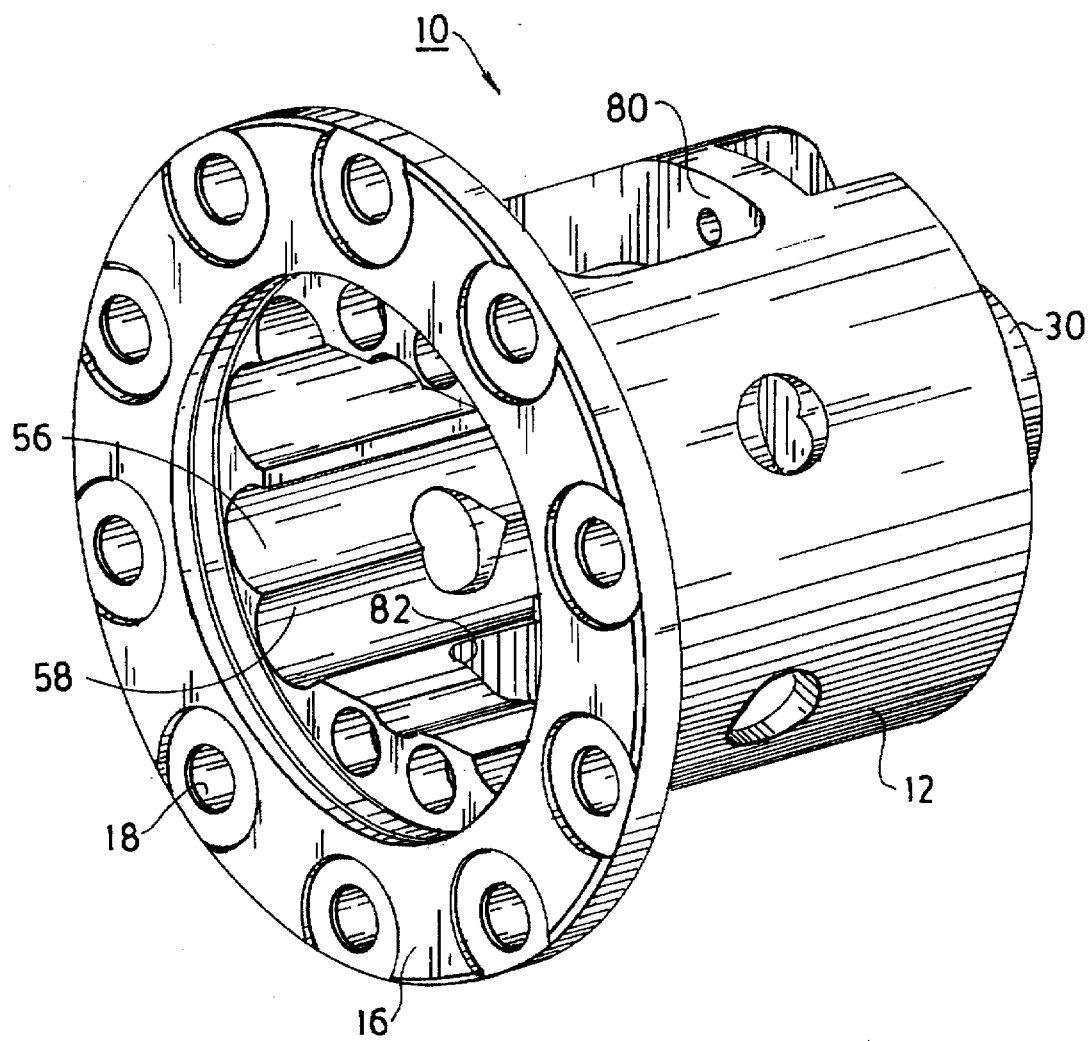
FIG. 3 is an isometric exterior view of the housing of the differential as shown in FIG. 1, the planetary gearing arrangement being omitted.

As can best be seen from FIG. 2, four sets of paired planet gears 48a, 50a; 48b, 50b; 48c, 50c; and 48d, 50d are distributed symmetrically, but non-equiangularly, about common axis 32. The planet gear pairs are organized in two separate sets which, for purposes of explanation, shall be designated as upper set 48a, 50a; 48b, 50b and as lower set 48c, 50c; 48d, 50d. The upper and lower sets of planet gears are separated by a first angular spacing X, while the planet pairs within each set are separated from each other by a second angular spacing Y. First angular spacings X are substantially larger than second angular spacings Y. In this preferred embodiment, angular spacings X are made large enough to separate the planetary sets by a distance substantially larger than the predetermined diameter of the outer circumferential surfaces of the planet gears, permitting windows 80 and 82 to be formed in main body 12 of sufficient size to readily facilitate assembly of C-clip washers 38, 40 to the respective ends of output drive shafts 20, 22. Windows 80, 82 are positioned in circumferential alignment with each angular spacing X.

In the embodiment shown in FIGS. I and 2, windows 80, 82 also receive and support thrust-block 46 when it is inserted between the respective ends 84, 86 of output drive shafts 20, 22 and between the opposed end faces of spaced side gears 34, 36. Appropriate recesses 88, 90 are formed in thrust-block 46 to receive shaft ends 84, 86, thereby permitting thrust-block 46 to contact the opposed end faces of spaced side gears 34, 36 as well as shaft ends 84, 86. A retainer pin 92 connects thrust-block 46 to main body 12 of housing 10 to prevent radial movement of thrust-block 46 during operation.

With reference to FIG. 5, the differential just described above is shown slightly modified to provide significant reductions in the cost of manufacture and weight as well as increased lubrication. These advantages are achieved by special designs relating to the form of the thrust-block and to its support in the differential housing. To facilitate description, the differential 10' is shown with two orthogonal radial centerlines 21, 23 which bisect, respectively, the angular spacings Y that separate the planet pairs within each set from each other and the angular spacings X that separate the two sets of planet gears.

An inner passageway aligned with orthogonal line 23 is formed between the opposed end faces of the side gears (only side gear 34' appears in FIG. 5), extending from a housing window 80' to a second housing window 82'; and a thrust-block 46' is positioned within this inner passageway between the opposed end faces of the side gears.

Thrust-block 46' includes two thrust surfaces (not visible in FIG. 5 but similar to thrust surfaces 81, 83 of thrust-block 46 in FIG. 1), each of which is received against a respective one of the opposed end faces of the side gears. The thickness of thrust-block 46' is measured between the thrust surfaces and is equivalent to the predetermined space T separating the opposed end faces of the side gears along common axis 32 (see FIG. 1).

Thrust-block 46' also has two respective support surfaces 47, 49, each extending parallel to orthogonal line 23. The width of thrust-block 46', measured between support surfaces 47, 49 is equivalent to the shortest distance W between the outer circumferential surfaces of planet gears 48b' and 50c' which are separated by first angular spacing X. The lengthwise dimension of each support surface 47, 49, measured parallel to second orthogonal line 23, is selected so that, when thrust block 46' is operatively positioned between the side gears, support surface 47 is in contact with only an outer circumferential surface of each of the planet gears 48b' and 50a', while support surface 49 is in contact with only an outer circumferential surface of each of the planet gears 48d' and 50c'. In addition to the support provided by surfaces 47, 49, a retainer pin 92' prevents motion of thrust-block 46' along orthogonal line 23.

[NOTE: As indicated above and in FIG. 4, in the preferred embodiments illustrated in the drawings, each planet gear shares three separated meshing portions with its mating planet gear. However, in some embodiments (not shown) the planet gears share only two separated meshing portions. Namely, referring to FIG. 4, in some embodiments planet gears 48, 50 share only first and third meshing portions 64, 74 and 68, 70; and second meshing portions 66, 72 of each gear is replaced by extensions of respective stem portions 76, 78, which are formed with smaller diameters than are the adjacent meshing portions to prevent interference with respective side gears 36 and 34. Therefore, when my invention is incorporated with this latter gearing arrangement, the phrase "outer circumferential surface" of each of the planet gears referred to above (and in the claims) identifies the outer surface of stem portions 76, 78 rather than the outer surface of second meshing portions 66, 72.]

With the just-described feature of the invention, housing windows 80', 82' do not support thrust-block 46' and, therefore, can be cast formed without machining to create openings larger than the cross-sectional area of the end dimensions of thrust-block 46', thereby reducing the cost of manufacture and, at the same time, reducing the weight of housing 10' and facilitating the flow of lubricant through housing 10' during operation of the differential.

Also, to further reduce the weight of the differential, thrust-block 46' itself is provided with large through-holes 94 and 96.

A further feature of the invention is illustrated in FIGS. 6, 7, and 8 which show a slightly modified thrust-block appropriate for providing a spring preload for the differential. In this embodiment, the thrust-block body is split into two mirror-image elements 146a and 146b. When fitted together, thrust-block elements 146a and 146b have respective thrust surfaces 181, 183 which, when operatively inserted in differential 10', are respectively positioned against a respective one of the opposed end faces of the side gears. The thickness of combined thrust-block elements 146a, 146b is measured between thrust surfaces 181, 183 and is equivalent to the distance T (i.e., the predetermined space separating the opposed end faces of the side gears along common axis 32 in FIG. 1).

When combined, thrust-block elements 146a, 146b also have two respective support surfaces 147, 149; and, again, the width of the combined thrust-block elements is measured between support surfaces 147, 149 and is equivalent to the shortest distance W between the outer circumferential surfaces of planet gears 48b' and 50c' which are separated by first angular spacing X (see FIG. 5). Further, in the manner indicated in the discussion above relating to FIG. 5, the lengths of support surfaces 147, 149 are selected so that, when combined thrust block elements 146a, 146b are operatively positioned between the side gears, support surfaces 147, 149 are in contact with only the outer circumferential surfaces of the four planet gears that are proximate the angular spacings X that separate the two sets of planet gears (e.g., planet gears 48b', 50a', 50c', 48d' in FIG. 5).

Similar to the thrust-blocks discussed above, combined thrust-block elements 146a, 146b include (a) a hole 193 for receiving a retainer pin; (b) appropriate recesses 188, 190 formed to receive shaft ends (e.g., shaft ends 84, 86 in FIG. 1), thereby permitting the combined thrust-block elements to contact the opposed end faces of spaced side gears as well as shaft ends on which the side gears are mounted; and (c) large through-holes 194 and 196 for weight reduction.

Combined thrust-block elements 146a, 146b, as just described above, may be used to replace thrust-block 46' in FIG. 5, since their exterior dimensions, when combined, are identical to those of thrust-block 46'; and in those instances where the windows of housing 10' are partially blocked by the thickness of a large ring gear (not shown) bolted to flange 16', the use of such a split thrust-block may be required to facilitate C-clip assembly.

Each thrust-block element 146a, 146b is provided with a respective guide bore 197, 198 for receiving respective disc compression springs (Belleville washers) 199, 200 which are used to exert a preload force against the respective end faces of the side gears. Also, the end portion of each thrust surface 181, 183 of thrust-block elements 146a, 146b is provided with a respective tapered lead 201, 202 to facilitate compression of springs 199, 200 during assembly.

With this design, the depth of bores 197, 198 can be selected to adjust the magnitude of the spring preload force; and, as noted above, if the differential is designed so that the side gears are provided with helical teeth of opposite hand so that the gears thrust outwardly in the drive mode, then the predetermined preload effect is realized throughout the full range of applied drive torque.

I claim:

1. In a parallel-axis gear differential for connecting a pair of drive axles which share a common axis of rotation and which require C-clip assembly, said differential having:

a housing rotatable about said pair of drive axles;

a pair of cylindrical side gears positioned in said housing (a) for receiving ends of the respective drive axles for rotation therewith about the common axis and (b) with opposed inner end faces separated along the common axis by a distance appropriate to permit C-clip assembly;

a plurality of cylindrical planet gears organized in meshing pairs and positioned circumferentially in said housing about said common axis for rotation about respective axes extending parallel to the common axis, each said cylindrical planet gear having a predetermined outer circumferential surface; and each of said planet gears including a first meshing portion in engagement with one of said side gears and a second meshing portion in engagement with a respective meshing portion of its paired planet gear, the meshing engagement of said side and planet gears interconnecting said respective axle ends in a mutual driving and load-transmitting relationship;

the improvement wherein:

said planet gears are symmetrically arranged about the common axis in two separated sets, with each said set including at least one meshing planet gear pair and with said two sets separated from each other by two first angular spacings of equal dimension selected to permit sufficient access to an interior portion of the differential to allow C-clip assembly;

said housing has at least one window for access to said interior portion of the differential for facilitating C-clip assembly, said window being positioned in circumferential alignment with at least one of said first angular spacings;

said housing has two orthogonal radial centerlines, and said two sets of planet gears are each centered along a first one of said orthogonal lines, while said second orthogonal line bisects said first angular spacings;

an inner passageway aligned with said second orthogonal line extends between said side gears from said housing window;

a thrust-block positioned within said inner passageway between the opposed end faces of said side gears, said thrust-block having:

two respective thrust surfaces, each facing a respective one of said opposed end faces, and a thickness, measured between said thrust surfaces, equivalent to said distance separating said opposed end faces along said common axis, and two respective support surfaces, each extending along a respective one of two lines parallel to said second orthogonal line, and a width, measured between said support surfaces, equivalent to the shortest distance between said outer circumferential surfaces of two planet gears separated by said first angular spacing; and said respective support surfaces each have a dimension parallel to said second orthogonal line selected so that, when said thrust-block is operatively positioned between said side gears, said respective support surfaces are in contact with only said outer circumferential surfaces of four respective planet gears.

2. The differential of claim 1 wherein each said planet gear set includes two meshing planet gear pairs, said pairs in each set being circumferentially separated from each other by respective second angular spacings which are substantially smaller than said first angular spacings.

3. The differential of claim 2 wherein said respective second angular spacings are relatively minimal distances sufficient to provide mechanical separation between said planet pairs of each set.

4. The differential of claim 2 wherein the axes of all of said planet gears are located at the same radial distance from the common axis.

5. The differential of claim 1 further comprising a retainer screw associated with said thrust-block to prevent radial movement of said thrust-block during operation of the differential.

6. The differential of claim 1 further comprising at least one spring element, and wherein said thrust-block comprises two side-by-side mating members with respective exterior thrust surfaces and said spring element is positioned between said mating thrust-block members so that, during operation of the differential, said spring element acts against said thrust-block members to cause said exterior thrust surfaces to exert a preload force between said opposed end faces of said side gears.

7. The differential of claim 6 wherein at least one of said thrust-block members includes at least one bore having a predetermined depth for receiving and positioning said spring element between said mating thrust-block members.

8. The differential of claim 7 wherein said preload force is controlled by adjusting said predetermined depth of the bore.

9. The differential of claim 6 wherein said cylindrical side gears have helical teeth of opposite hand arranged so that, during forward operation, said side gears exert thrust forces outwardly against said housing and said preload force is effective at all times during forward operation.

10. The differential of claim 6 wherein said respective exterior thrust surfaces of said thrust-block members are formed with a tapered lead at one end to facilitate assembly of said preloading thrust-block between said opposed end faces of said side gears.

11. In a parallel-axis gear differential for interconnecting a pair of drive axles which share a common axis of rotation, said differential having:

a housing rotatable about said pair of drive axles;

a pair of cylindrical side gears positioned in said housing for receiving ends of the respective drive axles for rotation therewith about the common axis;

a plurality of cylindrical planet gears organized in meshing pairs and positioned circumferentially in said housing about said common axis for rotation about respective axes extending parallel to the common axis; and each of said planet gears including a first meshing portion in engagement with one of said side gears and a second meshing portion in engagement with a respective meshing portion of its paired planet gear, the meshing portions of each said planet gear having an outer circumferential surface of predetermined diameter and the meshing engagement of said side and planet gears interconnecting said respective axle ends in a mutual driving and load-transmitting relationship;

the improvement wherein:

said pair of cylindrical side gears have opposed end faces and are positioned with a predetermined space between said opposed end faces along said common axis;

four separate and distinct pairs of said planet gears are symmetrically arranged about the common axis in two separated sets, with two planet gear pairs being positioned in each set, and with the axes of all of said planet gears located at the same radial distance from the common axis;

said two sets of planet gears are separated from each other by respective first angular spacings;

said two pairs of planet gears in each said set are circumferentially separated from each other by respective second angular spacings;

said housing has at least one window for providing access to said predetermined space between said opposed end faces of said side gears, said window being positioned in circumferential alignment with one of said first angular spacings;

said housing has two orthogonal radial centerlines, and said two sets of planet gears are each centered along a first one of said orthogonal lines, while said second orthogonal line bisects said first angular spacings;

an inner passageway aligned with said second orthogonal line extends between said opposed end faces of said side gears from said housing window; and said first angular spacings are substantially larger than said predetermined diameter of said outer circumferential surfaces of said planet gears, and said second angular spacings are substantially smaller than said predetermined diameter of said outer circumferential surfaces of said planet gears so that said four pairs of planet gears are distributed symmetrically-but-not-equiangularly about the common axis and said first angular spacings permit access through said window to said space separating said two opposed end faces of said side gears;

a thrust-block is positioned in said space separating said two opposed end faces of said side gears, said thrust-block having:

two respective thrust surfaces, each facing a respective one of said opposed end faces, and a thickness, measured between said thrust surfaces, equivalent to said predetermined space separating said opposed end faces along said common axis, and two respective support surfaces, each extending along a respective one of two lines parallel to said second orthogonal line, and a width, measured between said support surfaces, equivalent to the shortest distance between said outer circumferential surfaces of two planet gears separated by said first angular spacing; and said respective support surfaces each have a dimension parallel to said second orthogonal line selected so that, when said thrust block is operatively positioned between said side gears, said respective support surfaces are in contact with only said outer circumferential surfaces of four respective planet gears.

12. The differential of claim 11 further comprising a retainer screw associated with said thrust-block to prevent radial movement of said thrust-block during operation of the differential.

13. The differential of claim 11 further comprising at least one spring element, and wherein said thrust-block comprises two side-by-side mating members with respective exterior thrust surfaces and said spring element is positioned between said mating thrust-block members so that, during operation of the differential, said spring element acts against said thrust-block members to cause said exterior thrust surfaces to exert a preload force between said opposed end faces of said side gears.

14. The differential of claim 13 wherein at least one of said thrust-block members includes at least one bore having a predetermined depth for receiving and positioning said spring element between said mating thrust-block members.

15. The differential of claim 14 wherein said preload force is controlled by adjusting said predetermined depth of the bore.

16. The differential of claim 13 wherein said cylindrical side gears have helical teeth of opposite hand arranged so that, during forward operation, said side gears exert thrust forces outwardly against said housing and said preload force is effective at all times during forward operation.

17. The differential of claim 13 wherein said respective exterior thrust surfaces of said thrust-block members are formed with a tapered lead at one end to facilitate assembly of said preloading thrust-block between said opposed end faces of said side gears.

\* \* \* \* \*